United States Patent [19]
Boggs

[11] Patent Number: 5,120,079
[45] Date of Patent: Jun. 9, 1992

[54] AUTOMATIC BOW LATCH

[76] Inventor: Joe Donald Boggs, Rte. 3, Box 80N, Waverly, Tenn. 37185

[21] Appl. No.: 629,023

[22] Filed: Dec. 18, 1990

Related U.S. Application Data

[63] Continuation of Ser. No. 395,049, Aug. 17, 1989, abandoned.

[51] Int. Cl.$^5$ .................................................. B60P 3/10
[52] U.S. Cl. ................................ 280/414.1; 280/477; 280/508; 414/536
[58] Field of Search ............ 280/414.1, 414.2, 414.3, 280/477, 507, 508, 510; 114/344; 414/529, 536

[56] References Cited

U.S. PATENT DOCUMENTS

| | | | |
|---|---|---|---|
| 2,478,736 | 8/1949 | Balzer | 280/477 |
| 2,763,384 | 9/1956 | Foster | 414/536 |
| 2,844,390 | 7/1958 | Smith | 280/508 |
| 3,013,517 | 12/1961 | Isham | 280/508 |
| 3,155,249 | 11/1964 | Johnson | 280/414.1 |
| 3,161,422 | 12/1964 | Wade | 280/508 |
| 3,750,805 | 8/1973 | Finney | 414/536 |
| 3,912,302 | 10/1975 | Patterson | 280/477 |
| 3,989,267 | 11/1976 | Robinson | 414/536 |
| 4,114,920 | 9/1978 | Boettcher | 280/414.1 |
| 4,641,851 | 2/1987 | Knies | 280/414.1 |

FOREIGN PATENT DOCUMENTS

| | | | |
|---|---|---|---|
| 0137210 | 6/1987 | Japan | 280/508 |
| 0821233 | 4/1981 | U.S.S.R. | 280/508 |
| 1119862 | 10/1984 | U.S.S.R. | 280/477 |

Primary Examiner—Charles A. Marmor
Assistant Examiner—Anne Marie Boehler
Attorney, Agent, or Firm—Bailey & Hardaway

[57] ABSTRACT

An automatic boat bow latch has an elongated sloping lip for properly positioning the bow hook into the latch; a pair of guide arms equipped with rollers to guide the bow into proper alignment with the latch as well as protect both the bow of the boat and the bow latch.

1 Claim, 4 Drawing Sheets

AUTOMATIC BOW LATCH

This application is a continuation of application Ser. No. 07/395,049, filed Aug. 17, 1989, now abandoned.

BACKGROUND OF THE INVENTION

This invention relates to a bow latch which can be mounted on existing boat trailers and used to automatically secure a boat as it is driven onto a partially submerged trailer.

In the past, two persons have been required to position a boat onto a trailer; one to unwind the winch rope, attach it to the bow hook and then winch the boat onto the trailer while a second person stayed in the boat to keep it in proper alignment with the boat trailer. This method has numerous disadvantages. In addition to requiring a minimum of two people, there is an increased risk of possible injury caused by slippery surfaces, rocks, submerged glass, etc., along with the often undesirable but unavoidable need to get wet, as well as the physical strain associated with the winching operation.

With the numerous disadvantages inherent with the winching method, it is not surprising that several boat latches have been designed to overcome these disadvantages. Knies in U.S. Pat. No. 4,641,851 describes an automatic latch which hooks onto the bow hook of a boat. Robinson in U.S. Pat. No. 3,989,267 describes an automatic latch with spring loaded locking pin which is released by the bow ring to secure the boat. Boettcher describes a similar latch in U.S. Pat. No. 4,114,920 which has a spring loaded suspension system in addition to the spring loaded locking pin.

SUMMARY OF THE INVENTION

It is therefore an object of this invention to provide a novel bow latch for automatically securing a boat as it is driven onto a trailer.

It is a more particular object of this invention to provide a novel automatic bow latch with means to guide the bow hook into the latch as well as protect the bow of the boat and the latch itself.

It is a further and more particular object of the invention to provide a durable, sturdy latch which can be readily mounted to existing trailers.

It is a yet further object of this invention to provide a latch which can be mounted to boat trailers in addition to a winch.

These as well as other objects are accomplished by an automatic bow latch with an elongated sloping lip for properly positioning the bow hook into the latch; a pair of guide arms equipped with rollers to guide the bow into proper alignment with the latch as well as protect both the bow of the boat and the bow latch; a trigger block which releases a lock pin after the bow hook forces the block into a rectangular-shaped chamber; and means to adjustably mount the bow latch to the tongue and front roller bracket of an existing trailer.

DETAILED DESCRIPTION

In accordance with this invention it has been found that the bow latch of the present invention can be utilized to enable a single person to easily and safely position a boat onto a trailer. Furthermore, the invention permits such without an increased risk of damage to either the boat or the bow latch.

Figure 1:
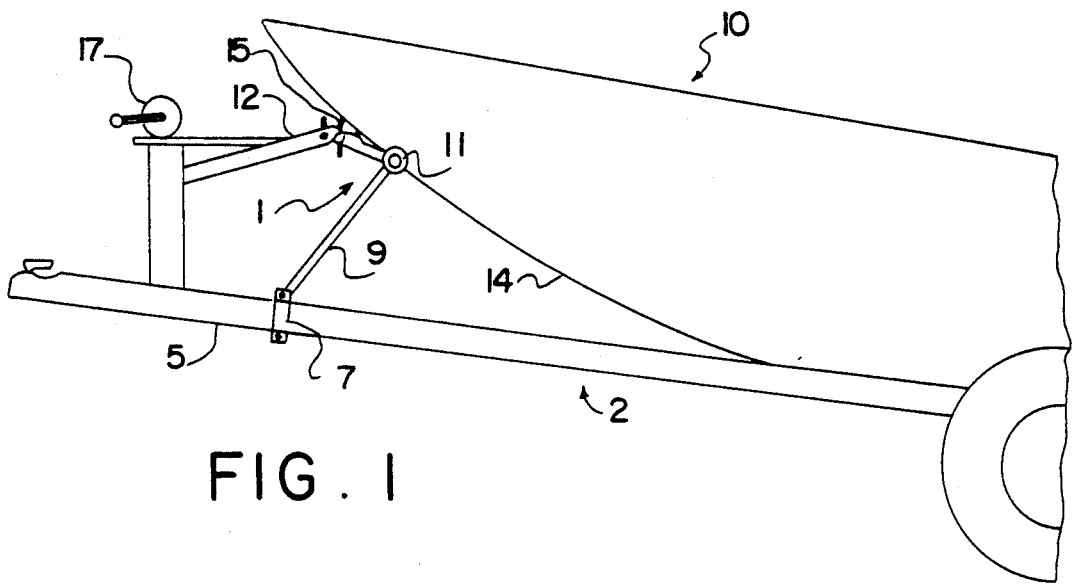
FIG. 1 of the drawings is a side-elevation view of the bow latch of the present invention mounted to a conventional boat trailer.
Figure 2:
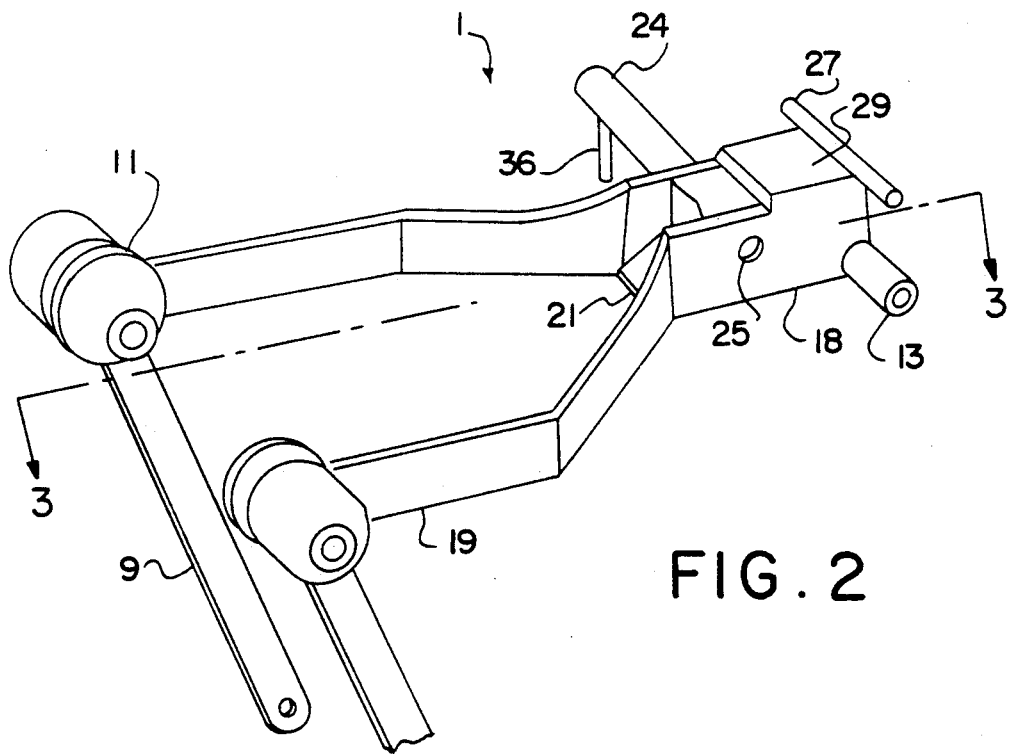
FIG. 2 of the drawings is a perspective view of the bow latch showing the various structural design.

FIG. 1 of the drawings illustrates how bow latch 1 attaches to trailer 2 at tongue 5 with tongue clamps 7 and at front roller bracket 12 with metal pipe 13 shown in FIG. 2. Tongue braces 9 are used to position rollers 11, the height of which can be adjusted according to the placement of the tongue clamps 7 along tongue 5. The rollers are used to properly align the bow hook 15 with bow latch 1 as well as prevent bow 14 from accidentally impacting bow latch 1. Winch 17 is shown in its conventional position.

In FIG. 2, bow latch 1 is shown in greater detail illustrating how side plates 18 extend outwardly and have a top portion tapering downward to become guide arms 19 which support rollers 11. Also shown is elongated lip 21 which guides bow hook 15 into proper contact with trigger block 23. Housing 24 perpendicular and aligned with aligned holes 25 is shown extending from one of the side plates 18. A winch guide 27 used to guide the winch strap (not shown) is also illustrated. The guide 27 may also be in the form of a roller.

Figure 3:
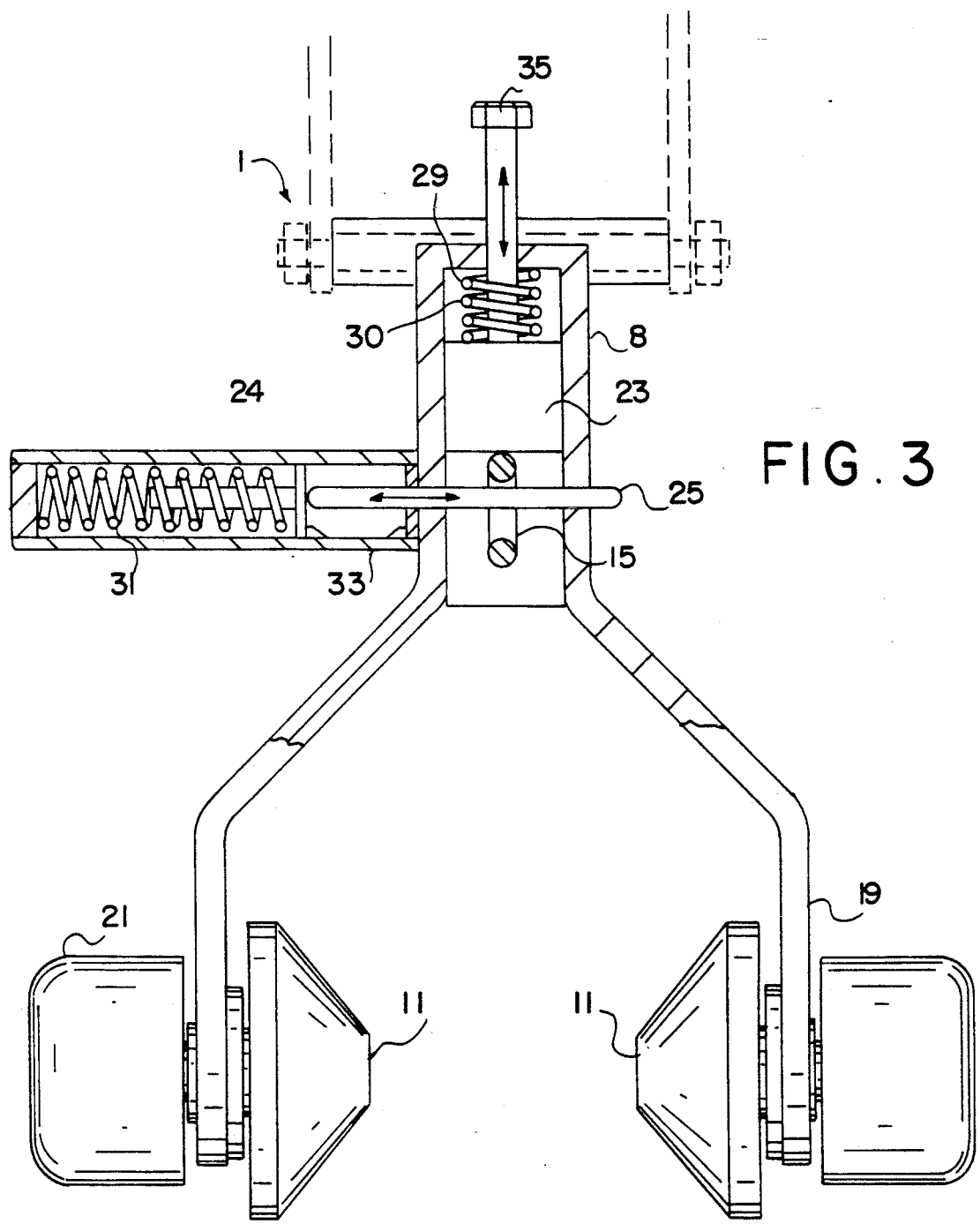
FIG. 3 is a cross-sectional view taken along line 3—3 of FIG. 2.

FIG. 3 taken along line 3—3 of FIG. 2 shows the internal mechanical parts of bow latch 1. Bow hook 15 is shown forcing trigger block 23 into rectangular chamber 30 and placing spring 29 into compression. Compression spring 31 is shown biasing lock pin 26 through bow hook 15 and into a locking position. Guide washers 33 as well as guide pin 35 are also shown.

Figure 4:
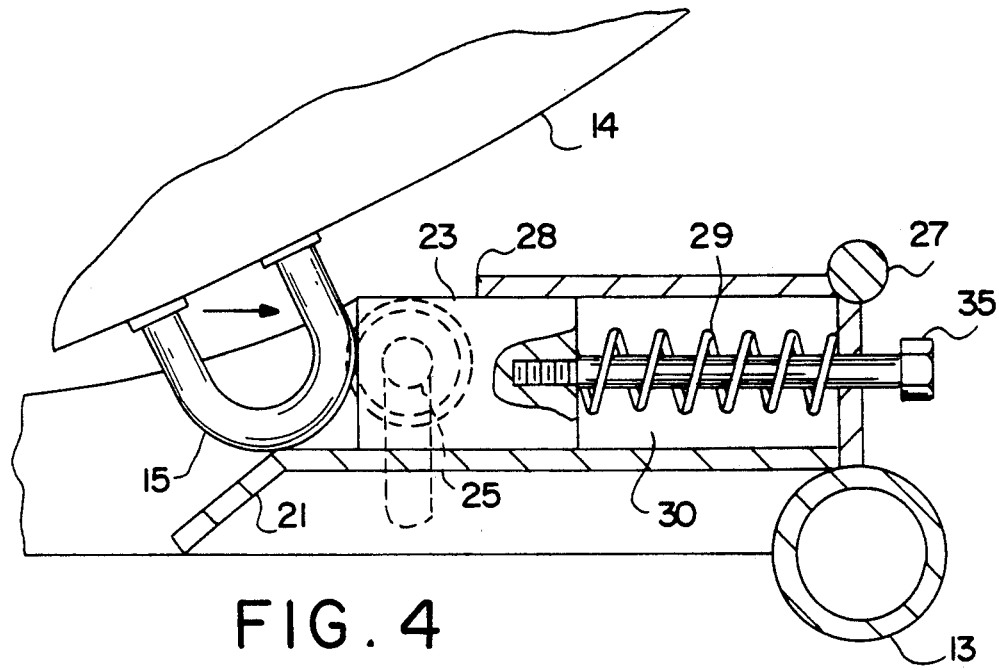
FIG. 4 is a cross-sectional view of the bow latch taken along line 4—4 of FIG. 3 showing the trigger block in the cocked position.

FIG. 4 is a side cross-sectional view taken along line 4—4 in FIG. 3 depicting bow hook 15 riding along elongated lip 21 and about to engage trigger block 23. Also shown is top plate 28 which helps define rectangular chamber 30 as well as act as stop means for bow hook 15 as depicted in FIG. 5.

Figure 5:
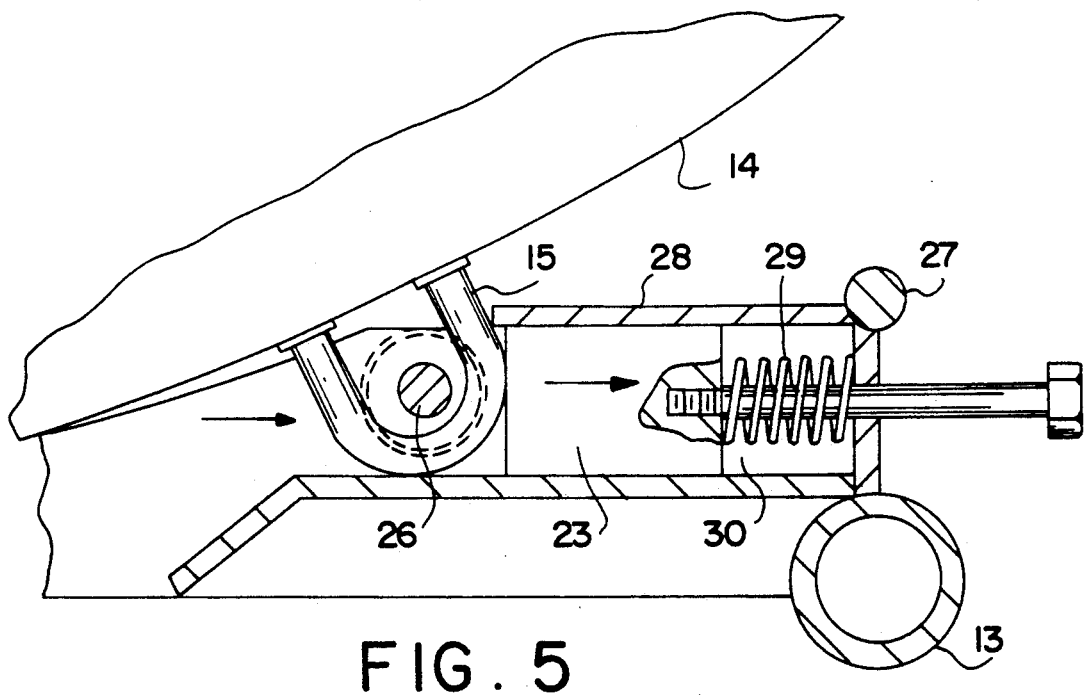
FIG. 5 is a view similar to FIG. 4 showing the trigger block after being forced into the rectangular-shaped chamber and the lock pin now in the locked position.

In FIG. 5, a view similar to FIG. 4 is shown, however, bow hook 15 has now moved forward pushing trigger block 23 back into rectangular chamber 30 and allowing lock pin 26 to be released thus securing the boat 10 as shown in FIG. 1.

Figure 6:
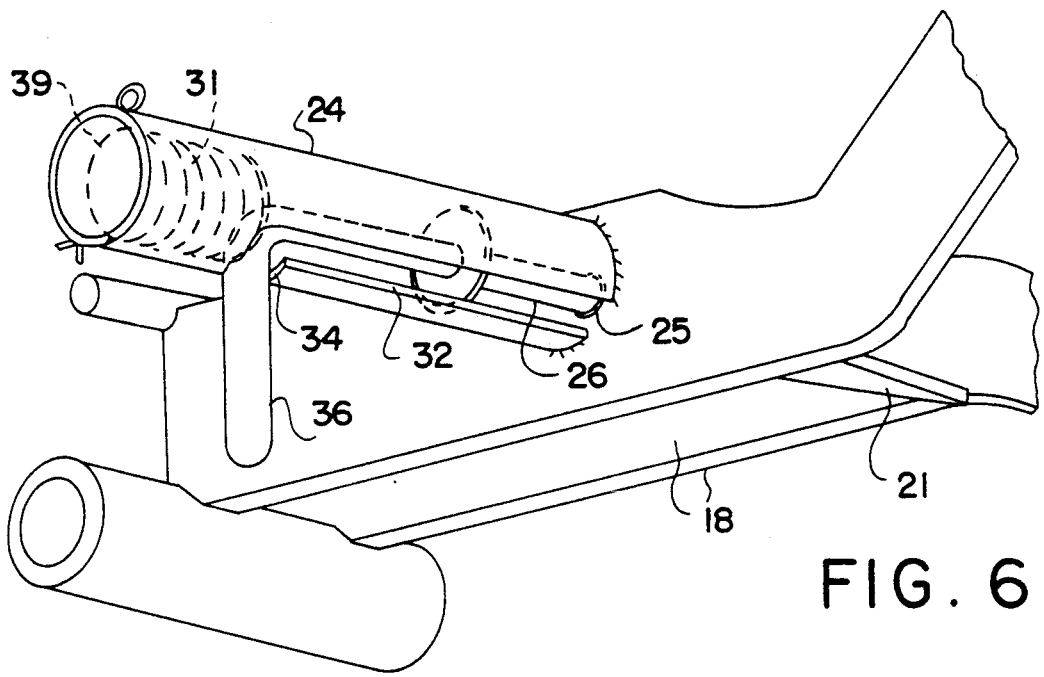
FIG. 6 is a bottom perspective view of the bow latch more clearly showing the features of the lock pin and its housing.

FIG. 6 is an enlarged bottom perspective view of housing 24 more clearly showing handle 36 pulled back in slot 32 and placed in notch 34 thus holding lock pin 26 in a locked position. Retaining wall 39 is illustrated holding spring 31 in a compressed state.

Figure 7:
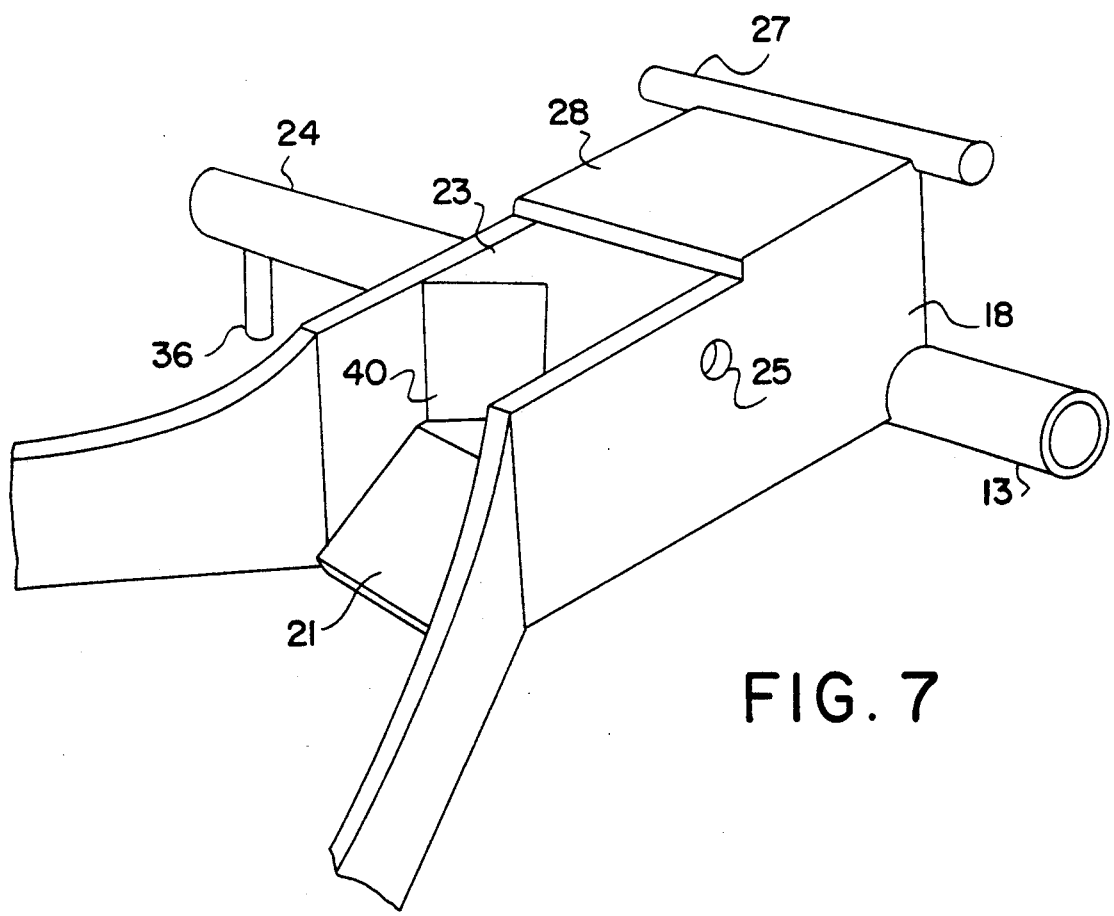
FIG. 7 is a perspective view of the bow latch similar to FIG. 2 but showing a modified design for the trigger block.

FIG. 7 is a perspective view similar to FIG. 2 showing a modification of the invention wherein the front face 40 of trigger block 23 has a v-notch instead of being flat.

It is thus seen that the instant invention provides a simple, dependable bow latch for automatically securing a boat to a trailer. It is further seen that this invention provides means for directing the bow hook into the latch as well as protecting both the bow latch and the bow of the boat from damage. Finally, it has been demonstrated that such a latch easily mounts to existing trailers without removal of the winch if the trailer is equipped with such. As many variations are apparent to one of skill in the art from reading of the above specification, such variations are within the spirit and scope of the instant invention as defined by the following appended claims.

That which is claimed is:

1. A bow latch for automatically securing a boat equipped with a bow hook to a trailer comprising:

a guide plate with a sloping, elongated lip;

two side plates connected along each edge of said guide plate forming a channel therebetween, said side plates extending outwardly past said lip and having a top portion tapering downward to form guide arms, said side plates also defining a first and a second aligned hole above said guide plate and forward of said lip;

a cover plate attached to top edges of aid side plates above and forward of said aligned holes and extending along said top edges until it joins a front plate enclosing the front portion of said channel and defining a generally rectangular chamber;

a pair of elongated tongue braces extending downward from the end of each said guide arm;

a pair of trailer tongue clamps adjustably attaching said tongue braces to a tongue of said trailer;

a pipe, made of metal, attached below said cover plate and at the ends of said side plates remote from said guide arms, said pipe attached by bolt means to a front roller bracket of said trailer;

a housing extending outwardly from one of said side plates and aligned with said aligned holes having a retaining wall remote from said side plate said housing defining an elongated slot therein;

a lock pin encircled by said housing;

a handle protruding through said elongated slot in said housing and said handle attached to said lock pin;

means biasing said lock pin through said aligned holes;

a guide pin passing through said front plate and engaging a trigger block slidably mounted within said channel; and means biasing said trigger block between said aligned holes when said lock pin is retracted into said housing thereby blocking movement of said lock pin and placing said bow latch into a cocked position, whereby said lock pin is released from said cocked position when said bow hook of said boat slides said trigger block back into said rectangular chamber allowing said lock pin to be biased through the first said aligned hole, said bow hook and the second said aligned hole thus securing said boat to said trailer.

* * * * *